US012437694B2

(12) United States Patent
Lee et al.

(10) Patent No.: US 12,437,694 B2
(45) Date of Patent: Oct. 7, 2025

(54) DISPLAY DEVICE HAVING TOUCH SENSOR AND DRIVING METHOD OF THE SAME

(71) Applicant: LG Display Co., Ltd., Seoul (KR)

(72) Inventors: Dong Gun Lee, Paju-si (KR); Bo Gun Seo, Paju-si (KR); Kyu Jin Kim, Paju-si (KR); Seung Taek Oh, Paju-si (KR); Bo Yun Jung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/211,081

(22) Filed: Jun. 16, 2023

(65) Prior Publication Data

US 2024/0221581 A1 Jul. 4, 2024

(30) Foreign Application Priority Data

Dec. 29, 2022 (KR) ........................ 10-2022-0188897

(51) Int. Cl.
*G09G 3/20* (2006.01)
*G09G 3/3233* (2016.01)

(52) U.S. Cl.
CPC ......... *G09G 3/2074* (2013.01); *G09G 3/2096* (2013.01); *G09G 3/3233* (2013.01); *G09G 2300/0452* (2013.01); *G09G 2300/0842* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2011/0115832 | A1* | 5/2011 | Lee | G09G 3/3233 345/212 |
| 2016/0042687 | A1* | 2/2016 | Jeong | G09G 3/3233 345/690 |
| 2021/0327367 | A1* | 10/2021 | An | G09G 3/3685 |
| 2022/0020306 | A1* | 1/2022 | Park | G09G 3/2096 |
| 2022/0199006 | A1* | 6/2022 | Chun | G09G 5/005 |
| 2022/0215798 | A1* | 7/2022 | Pyun | G09G 3/2096 |
| 2022/0358884 | A1* | 11/2022 | Chae | G09G 3/3233 |
| 2023/0086548 | A1* | 3/2023 | Li | G09G 3/3648 345/212 |
| 2024/0078974 | A1* | 3/2024 | Kim | G09G 3/3233 |

FOREIGN PATENT DOCUMENTS

| | | | |
|---|---|---|---|
| KR | 10-2022-0042843 | A | 4/2022 |
| KR | 10-2022-0057900 | A | 5/2022 |
| KR | 10-2022-0059697 | A | 5/2022 |

* cited by examiner

*Primary Examiner* — Benjamin C Lee
*Assistant Examiner* — Emily J Frank
(74) *Attorney, Agent, or Firm* — Birch, Stewart, Kolasch & Birch, LLP

(57) ABSTRACT

Provided are a display device and a driving method thereof. The display device includes a display panel with a plurality of pixels, a power supply configured to apply a pixel driving voltage and a low-potential supply voltage to the plurality of pixels, and a timing controller configured to adjust the low-potential supply voltage when a maximum grayscale represented by pixel data to be applied to the plurality of pixels is equal to or less than a predetermined threshold.

15 Claims, 17 Drawing Sheets

| | | | | | |
|---|---|---|---|---|---|
| 230 | 250 | 240 | 245 | 250 | 255 |
| 250 | 255 | 250 | 240 | 245 | 250 |
| 240 | 245 | 240 | 245 | 240 | 245 |
| 250 | 240 | 245 | 250 | 250 | 255 |
| 250 | 255 | 250 | 240 | 245 | 250 |
| 250 | 240 | 245 | 250 | 240 | 245 |

| | | | | | |
|---|---|---|---|---|---|
| 30 | 20 | 40 | 24 | 20 | 55 |
| 20 | 25 | 50 | 20 | 25 | 50 |
| 40 | 25 | 40 | 45 | 40 | 45 |
| 50 | 40 | 45 | 50 | 50 | 55 |
| 50 | 55 | 50 | 20 | 45 | 50 |
| 20 | 40 | 45 | 20 | 40 | 45 |

DISPLAY DEVICE HAVING TOUCH SENSOR AND DRIVING METHOD OF THE SAME

CROSS-REFERENCE TO RELATED APPLICATION

This application claims priority to and the benefit of Korean Patent Application No. 10-2022-0188897, filed on Dec. 29, 2022 in the Republic of Korea, the entire contents of which are hereby expressly incorporated by reference into the present application.

BACKGROUND

1. Field

The present disclosure relates to a display device and a driving method thereof.

2. Discussion of Related Art

An electroluminescence display device is broadly classified into an inorganic light emitting display device and an organic light emitting display device according to the material of a light emitting layer. An active-matrix type organic light emitting display device includes an organic light emitting diode (hereinafter, referred to as "OLED") which emits light by itself, and has an advantage of a quick response time, high luminous efficiency, high luminance, and a wide viewing angle.

In the organic light emitting display device, the OLED (organic light emitting diode which is referred to as "OLED") is formed in each pixel. The organic light emitting display device has a quick response time, excellent luminous efficiency, luminance, and viewing angle, and the like, and since a black gray level can be expressed as perfect black, a contrast ratio and color gamut are excellent.

Multi-media functions of a mobile device have been improved. For example, a camera is built-in in a smart phone, and the resolution of the camera is increasing to a level of that of a conventional digital camera. However, a front camera of the smart phone can limit a screen design, and thus the screen design may become difficult.

In order to reduce a space occupied by the camera, a screen design including a notch or a punch hole has been adopted in a smart phone, but since a screen size is still limited due to the camera, it is still challenging to implement a full-screen display.

In order to realize the full-screen display, a method of providing a sensing region where pixels of a low pixels per inch (PPI) are disposed in a screen of a display panel, and disposing a camera at a position opposite the sensing region under the display panel is proposed. A sensing area of a screen functions as a transparent display that displays an image.

In this case, driving is performed by setting a margin of a low-potential supply voltage ELVSS to be large according to driving characteristics of the sensing area, and thus a voltage applied to a light-emitting element increases, which can result in an increase of power consumption.

SUMMARY OF THE DISCLOSURE

The present disclosure is directed to solving or addressing all the above-described needs as well as other limitations associated with the related art.

The present disclosure provides a display device capable of reducing power consumption and a driving method thereof.

It should be noted that objects of the present disclosure are not limited to the above-described objects, and other objects of the present disclosure will be apparent to those skilled in the art from the following descriptions.

According to an aspect of the present disclosure, a display device includes a display panel with a plurality of pixels, a power supply configured to apply a pixel driving voltage and a low-potential supply voltage to the plurality of pixels, and a timing controller configured to adjust the low-potential supply voltage when a maximum grayscale represented by pixel data to be applied to the plurality of pixels is equal to or less than a predetermined threshold.

According to an aspect of the present disclosure, a display device includes a display panel with a plurality of pixels, a power supply configured to apply a pixel driving voltage and a low-potential supply voltage to the plurality of pixels, and a host system configured to adjust the low-potential supply voltage when a maximum grayscale represented by pixel data to be supplied to the plurality of pixels is equal to or less than a predetermined threshold.

According to an aspect of the present disclosure, a driving method includes extracting a maximum grayscale from among grayscale represented by pixel data to be supplied to a plurality of pixels in a display panel; comparing whether the extracted maximum grayscale is equal to or less than a predetermined threshold; and when the maximum grayscale is determined to be equal to or less than the predetermined threshold, calculating a voltage variation and adjusting a low-potential supply voltage, which is to be applied to the plurality of pixels, by the voltage variation.

According to an aspect of the present disclosure, a display device comprises a display panel with a plurality of pixels corresponding to a sensing area; and a power supply configured to apply a first pixel driving voltage and a second pixel driving voltage to the plurality of pixels, wherein the first pixel driving voltage is lower than the second pixel driving voltage, the first pixel driving voltage is set to have a first value when a maximum grayscale represented by pixel data to be applied to the plurality of pixels is greater than a predetermined threshold, the first pixel driving voltage is set to have a second value when the maximum grayscale represented by the pixel data to be applied to the plurality of pixels is equal to or less than the predetermined threshold, and the first value is less than the second value.

According to the present disclosure, a low-power display device can be implemented by adjusting a low-potential supply voltage when a maximum grayscale represented by pixel data to be supplied to a display area or a sensing area is equal to or less than a predetermined threshold.

According to the present disclosure, the degradation of image quality can be prevented by adjusting a low-potential supply voltage by a predetermined voltage variation in phases in a predetermined number of frame periods.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EMBODIMENTS

Figure 1:
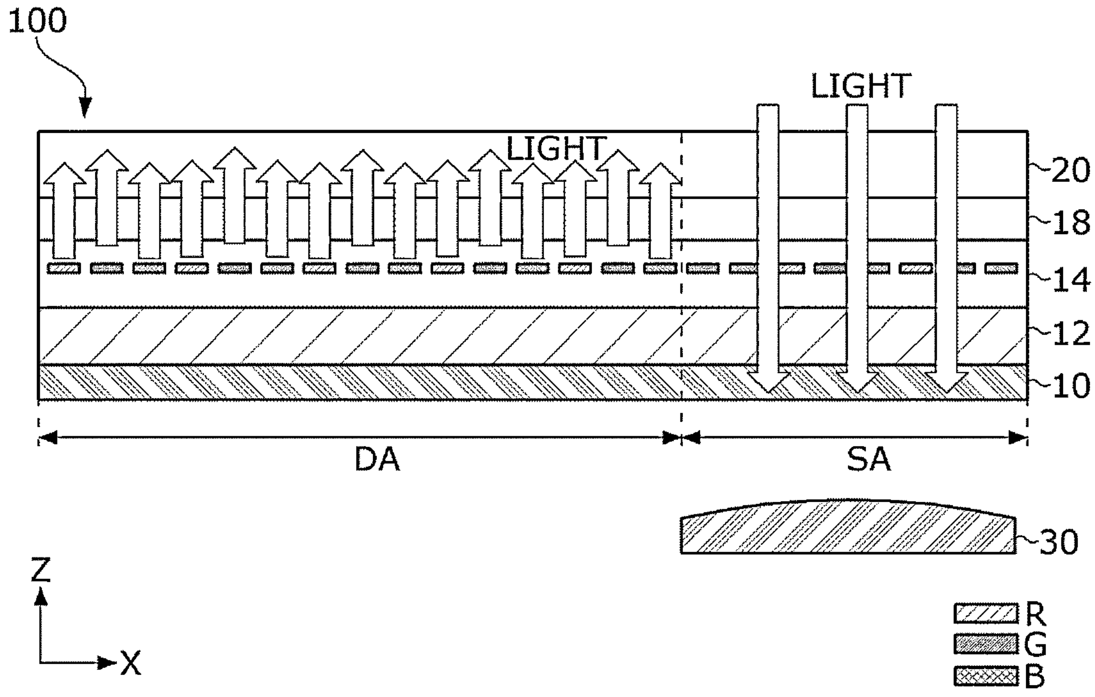
FIG. 1 is a schematic cross-sectional view of a display panel according to an embodiment of the present disclosure.

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies can be omitted to avoid unnecessarily obscuring the subject matter of the present disclosure.

The terms such as "comprising," "including," "having," etc. used herein are generally intended to allow other components to be added unless the terms are used with the term "only." Any references to singular can include plural unless expressly stated otherwise.

Components are interpreted to include an ordinary error range even if not expressly stated.

When the position relation between two components is described using the terms such as "on," "above," "below," and "next," one or more components can be positioned between the two components unless the terms are used with the term "immediately" or "directly."

The terms "first," "second," and the like can be used to distinguish components from each other, but the functions or structures of the components are not limited by ordinal numbers or component names in front of the components.

The same reference numerals can refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

In embodiments, when the first resolution is referred to as a high resolution, and the second resolution is referred to as a low resolution, an area in which pixels are arranged at the low resolution is named a sensing area. Here, the sensing area includes at least one of a sensing area including a camera module or an infrared sensor and a sensing area including a fingerprint recognition module, but the present disclosure is not limited thereto. Such a sensing area is an area designed to have a resolution lower than that of a display area. Further, all the components of each display panel and each display apparatus according to all embodiments of the present disclosure are operatively coupled and configured.

Figure 2:
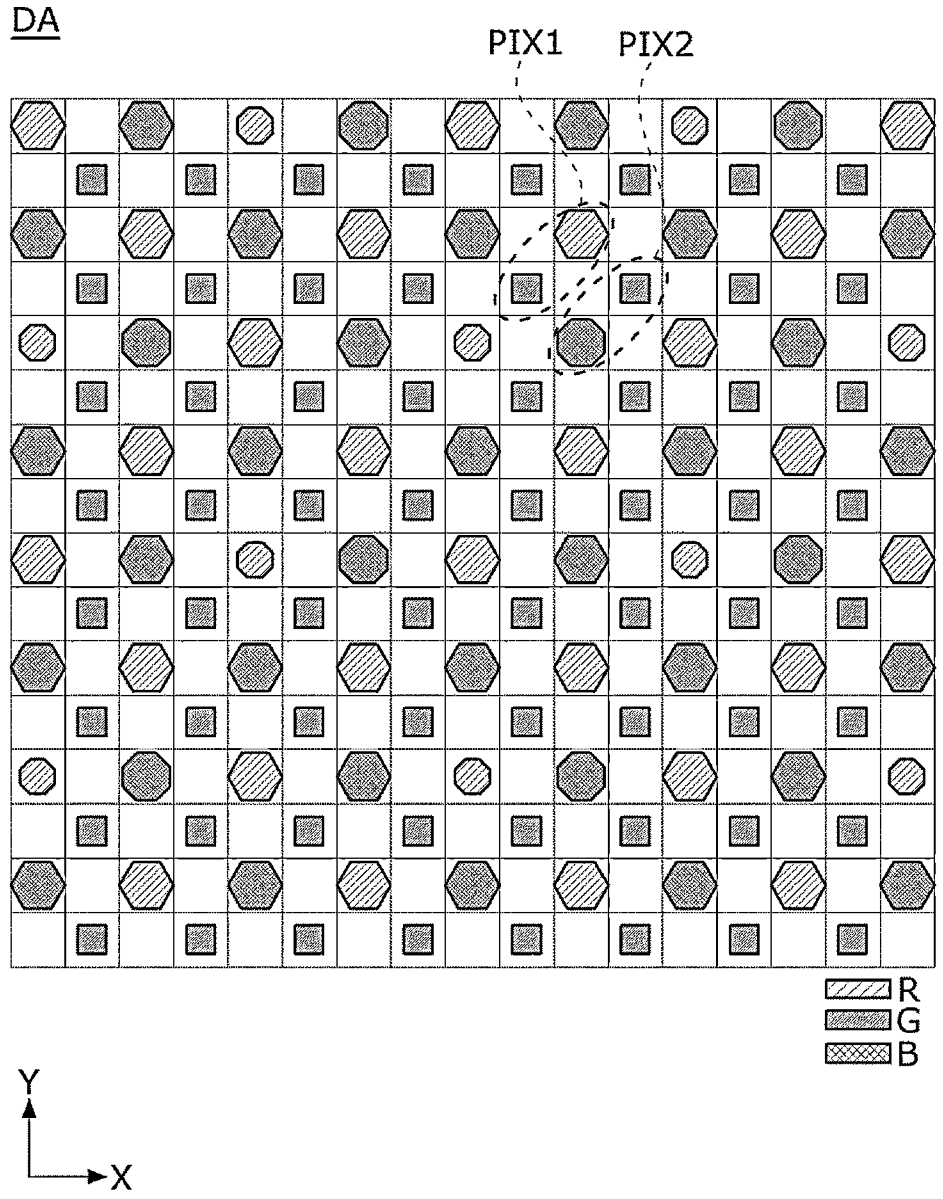
FIG. 2 is a diagram illustrating an example of an arrangement of pixels in a display area according to an embodiment of the present disclosure.
Figure 3:
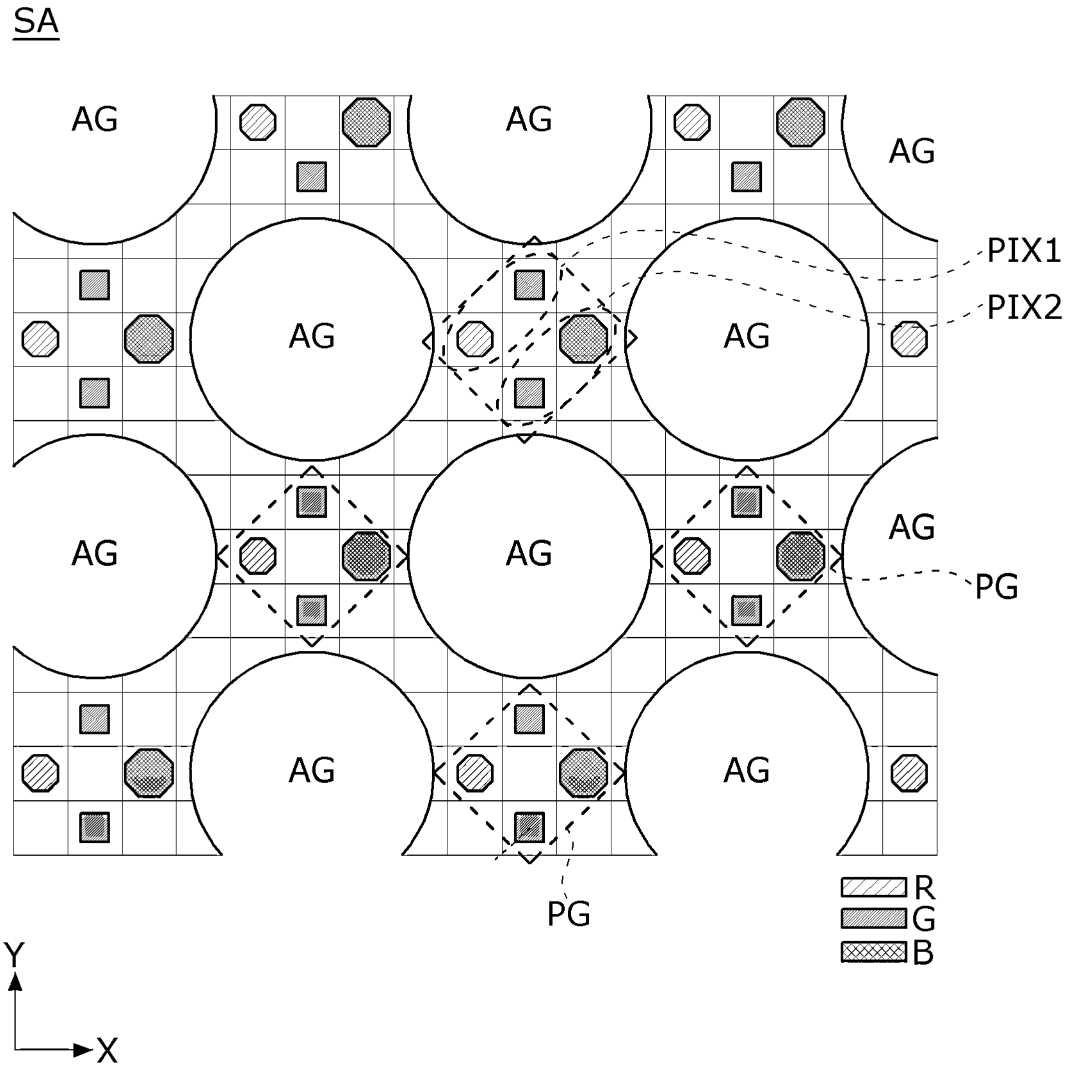
FIG. 3 is a diagram illustrating examples of pixels and a light-transmitting part of a sensing area according to an embodiment of the present disclosure.

FIG. 1 is a sectional view schematically illustrating a display panel according to an embodiment of the present disclosure, FIG. 2 is a view illustrating an example of pixel arrangement in a display area DA of the display panel, and FIG. 3 is a view illustrating an example of a pixel and a light transmitting part in a sensing area SA of the display panel. In FIGS. 2 and 3, wiring connected to pixels is omitted.

Referring to FIGS. 1 and 3, a screen of a display panel 100 includes at least a display area DA in which pixels are arranged at a high resolution and a sensing area SA in which pixels are arranged at a low resolution. Here, the area in which the pixels are arranged at the high resolution, for example, a high-resolution area, can include an area in which the pixels are arranged at a high pixels per inch (PPI), for example, a high PPI area, and the area in which the pixels are arranged at the low resolution, for example, a low-resolution area, can include an area in which the pixels are arranged at a low PPI, for example, a low PPI area.

The display area DA and the sensing area SA include a pixel array in which pixels in which pixel data is written are arranged. The number of pixels per unit area, for example, the PPI, of the sensing area SA is lower than the PPI of the display area DA in order to secure the transmittance of the sensing area SA.

The pixel array of the display area DA includes a pixel area (first pixel area) in which a plurality of pixels having a high PPI are arranged. The pixel array of the sensing area SA includes a pixel area (second pixel area) in which a plurality of pixel groups PG spaced by the light transmitting part and thus having a relatively low PPI are arranged. In the sensing area SA, external light can pass through the display panel 100 through the light transmitting part having a high light transmittance and can be received by an imaging element module below the display panel 100.

Since the display area DA and the sensing area SA include pixels, an input image is reproduced on the display area DA and the sensing area SA.

Each of the pixels of the display area DA and the sensing area SA include sub-pixels having different colors to realize the color of the image. Sub-pixels include a red sub-pixel (hereinafter, referred to as an "R sub-pixel"), a green sub-pixel (hereinafter, referred to as a "G sub-pixel"), and a blue sub-pixel (hereinafter, referred to as a "B sub-pixel"). Each of the pixels P can further include a white sub-pixel (hereinafter, a "W sub-pixel"). Each of the sub-pixels can include a pixel circuit and a light emitting element OLED.

The sensing area SA includes the pixels and the imaging element module disposed below the screen of the display panel 100. A lens 30 of the imaging element module displays an input image by writing pixel data of the input image in the pixels of the sensing area SA in a display mode. The imaging element module captures an external image in an imaging mode and outputs a picture or moving image data. The lens 30 of the imaging element module faces the sensing area SA. The external light is incident on the lens 30 of the imaging element module, and the lens 30 collects the light in an image sensor that is omitted in the drawings. The imaging element module captures an external image in the imaging mode and outputs a picture or moving image data.

In order to secure the transmittance, an image quality compensation algorithm for compensating for the luminance and color coordinates of pixels in the sensing area SA can be applied due to pixels removed from the sensing area SA.

In the present disclosure, since the low-resolution pixels are arranged in the sensing area SA, a display area of the screen is not limited in relation to the imaging element module, and thus a full-screen display can be implemented.

The display panel 100 has a width in an X-axis direction, a length in a Y-axis direction, and a thickness in a Z-axis direction. The display panel 100 includes a circuit layer 12 disposed on a substrate 10 and a light emitting element layer 14 disposed on the circuit layer 12. A polarizing plate 18 can be disposed on the light emitting element layer 14, and a cover glass 20 can be disposed on the polarizing plate 18.

The circuit layer 12 can include a pixel circuit connected to wirings such as data lines, gate lines, and power lines, a gate drive part connected to the gate lines, and the like. The circuit layer 122 can include circuit elements such as a transistor implemented as a thin film transistor (TFT) and a capacitor. The wirings and circuit elements of the circuit layer 12 can be formed of a plurality of insulating layers, two or more metal layers separated with the insulating layers therebetween, and an active layer including a semiconductor material.

The light emitting element layer 14 can include a light emitting element driven by the pixel circuit. The light emitting element can be implemented as an organic light emitting diode (OLED). The OLED includes an organic compound layer formed between an anode and a cathode. The organic compound layer can include a hole injection layer HIL, a hole transport layer HTL, an emission layer EML, an electron transport layer ETL, and an electron injection layer EIL, but the present disclosure is not limited thereto. When a voltage is applied to the anode and the cathode of the OLED, holes passing through the hole transport layer HTL and electrons passing through the electron transport layer ETL are moved to the emission layer EML to form excitons, and thus visible light is emitted from the emission layer EML. The light emitting element layer 14 can be disposed on pixels that selectively transmit light having red, green, and blue wavelengths and can further include a color filter array.

The light emitting element layer 14 can be covered with a protective film, and the protective film can be covered with an encapsulation layer. The protective layer and the encapsulation layer can have a structure in which an organic film and an inorganic film are alternately stacked. The inorganic film blocks permeation of moisture or oxygen. The organic film planarizes the surface of the inorganic film. When the organic film and the inorganic film are stacked in multiple layers, a movement path of the moisture or oxygen is longer than that of a single layer, and thus the permeation of the moisture/oxygen affecting the light emitting element layer 14 can be effectively blocked.

The polarizing plate 18 can adhere to the encapsulation layer. The polarizing plate 18 improves outdoor visibility of the display device. The polarizing plate 18 reduces an amount of light reflected from the surface of the display panel 100, blocks the light reflected from metal of the circuit layer 12, and thus improves the brightness of pixels. The polarizing plate 18 can be implemented as a polarizing plate, in which a linear polarizing plate and a phase delay film are bonded to each other, or a circular polarizing plate.

In the display panel of the present disclosure, each pixel area of the display area DA and the sensing area SA includes a light shielding layer. The light shielding layer is removed from the light transmitting part of the sensing area to define the light transmitting part. The light shielding layer includes an opening hole corresponding to a light transmitting part area. The light shielding layer is removed from the opening hole. The light shielding layer is formed of a metal or inorganic film having a lower absorption coefficient than that of the metal removed from the light transmitting part with respect to the wavelength of a laser beam used in a laser ablation process of removing a metal layer present in the light transmitting part.

Referring to FIG. 2, the display area DA includes pixels PIX1 and PIX2 arranged in a matrix form. Each of the pixels PIX1 and PIX2 can be implemented as a real type pixel in which the R, G, and B sub-pixels of three primary colors are formed as one pixel. Each of the pixels PIX1 and PIX2 can further include the W sub-pixel that is omitted in the drawings. Further, two sub-pixels can be configured as one pixel using a sub-pixel rendering algorithm. For example, the first pixel PIX1 can be configured as R and G sub-pixels, and the second pixel PIX2 can be configured as B and G sub-pixels. Insufficient color representation in each of the pixels PIX1 and PIX2 can be compensated for by an average value of corresponding color data between adjacent pixels.

Referring to FIG. 3, the sensing area SA includes pixel groups PG spaced apart from each other by a predetermined distance D1 and light transmitting parts AG arranged between the adjacent pixel groups PG. The external light is received by the lens 30 of the imaging element module through the light transmitting parts AG. The light transmitting parts AG can include transparent media having high transmittance without a metal so that light can be incident with minimum light loss. In other words, the light transmitting parts AG can be formed of transparent insulating materials without including metal lines or pixels. The transmittance of the sensing area SA becomes higher as the light transmitting parts AG becomes larger.

The pixel group PG can include one or two pixels. Each of the pixels of the pixel group PG can include two to four sub-pixels. For example, one pixel in the pixel group PG can include R, G, and B sub-pixels or can include two sub-pixels and can further include a W sub-pixel. In an example of FIG. 3, the first pixel PIX1 is configured as R and G sub-pixels, and the second pixel PIX2 is configured as B and G sub-pixels, but the present disclosure is not limited thereto.

A distance D3 between the light transmitting parts AG is smaller than a distance D1 between the pixel groups PG. A distance D2 between the sub-pixels is smaller than the distance D1 between the pixel groups PG.

The shape of the light transmitting parts AG is illustrated as a circular shape in FIG. 3, but the present disclosure is not limited thereto. For example, the light transmitting parts AG can be designed in various shapes such as a circle, an ellipse, and a polygon. The light transmitting parts AG can be defined as areas in the screen from which all metal layers are removed.

Figure 4:
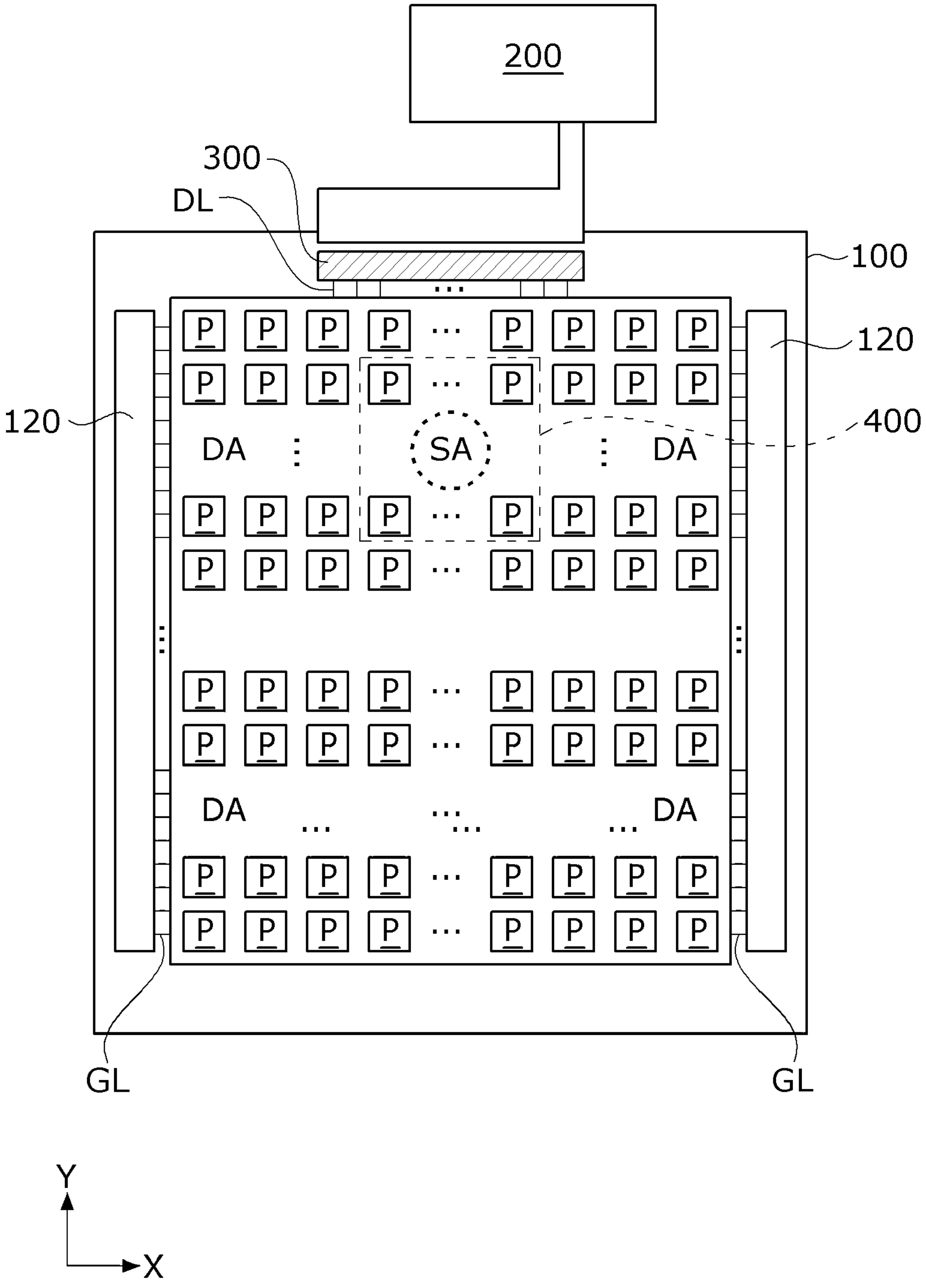
FIG. 4 is a diagram illustrating an overall configuration of a display device according to an embodiment of the present disclosure.
Figure 5:
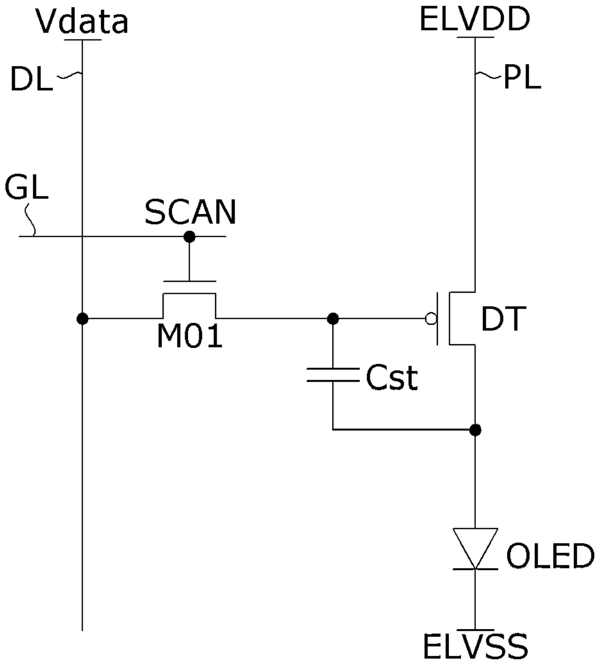
FIG. 5 is a circuit diagram illustrating a pixel circuit shown in FIG. 4.

FIG. 4 is a view illustrating the entire configuration of a display device according to the embodiment of the present disclosure, and FIG. 5 is a view schematically illustrating a configuration of a drive integrated circuit (IC) illustrated in FIG. 4.

Referring to FIG. 4, the display device according to the embodiment of the present disclosure includes the display panel 100 in which the pixel array is disposed on the screen, a display panel driver that drives the display panel 100, and the like.

The pixel array of the display panel 100 includes data lines DL, gate lines GL intersecting the data lines DL, and pixels P defined by the data lines DL and the gate lines GL and arranged in a matrix form.

As illustrated in FIG. 1, the pixel array can be divided into the circuit layer 12 and the light emitting element layer 14. A touch sensor array can be disposed on the light emitting element layer 14. Each of the pixels of the pixel array can include two to four sub-pixels as described above. Each of the sub-pixels includes a pixel circuit disposed in the circuit layer 12.

The screen on which the input image is reproduced on the display panel 100 includes the display area DA and the sensing area SA.

Sub-pixels of each of the display area DA and the sensing area SA include pixel circuits. The pixel circuit can include a drive element that supplies a current to the light emitting element OLED, a plurality of switch elements that sample a threshold voltage of the drive element and switch a current path of the pixel circuit, a capacitor that maintains a gate voltage of the drive element, and the like. The pixel circuit is disposed below the light emitting element OLED.

The sensing area SA includes the light transmitting parts AG arranged between the pixel groups PG and an imaging element module 400 disposed below the sensing area SA. The imaging element module 400 photoelectrically converts light incident through the sensing area SA in the imaging mode using the image sensor, converts the pixel data of the image output from the image sensor into digital data, and outputs the captured image data.

The display panel driver writes the pixel data of the input image to the pixels P. The pixels P can be interpreted as a pixel group PG including a plurality of sub-pixels.

The display panel driver includes a drive IC 300, which supplies a data voltage of the pixel data to the data lines DL, and a gate driver 120 that sequentially supplies a gate pulse to the gate lines GL. The display panel driver can further include a touch sensor driver that is omitted in the drawings.

The drive IC 300 can adhere to the display panel 100. The drive IC 300 includes a data driver and a timing controller, and receives pixel data of the input image and a timing signal from a host system 200, supplies a data voltage of the pixel data to the pixels, and synchronizes the data driver and the gate driver 120.

The drive IC 300 is connected to the data lines DL through data output channels to supply the data voltage of the pixel data to the data lines DL. The drive IC 300 can output a gate timing signal for controlling the gate driver 120 through gate timing signal output channels. The gate timing signal generated from a timing controller 303 can include a gate start pulse VST, a gate shift clock CKL, and the like.

The host system 200 can be implemented as an application processor (AP). The host system 200 can transmit pixel data of the input image to the drive IC 300 through a mobile industry processor interface (MIPI). The host system 200 can be connected to the drive IC 300 through a flexible printed circuit (FPC).

Meanwhile, the display panel 600 can be implemented as a flexible panel that can be applied to a flexible display. In the flexible display, the size of the screen can be changed by winding, folding, and bending the flexible panel, and the flexible display can be easily manufactured in various designs. The flexible display can be implemented as a rollable display, a foldable display, a bendable display, a slidable display, and the like. The flexible panel can be manufactured as a so-called "plastic OLED panel." The plastic OLED panel can include a back plate and a pixel array on an organic thin film bonded to the back plate. The touch sensor array can be formed on the pixel array.

The back plate can be a polyethylene terephthalate (PET) substrate. The pixel array and the touch sensor array can be formed on the organic thin film. The back plate can block permeation of moisture toward the organic thin film so that the pixel array is not exposed to the moisture. The organic thin film can be a polyimide (PI) substrate. A multi-layered buffer film can be formed of an insulating material that is not illustrated on the organic thin film. The circuit layer 12 and the light emitting element layer 14 can be stacked on the organic thin film.

In the display device of the present disclosure, the pixel circuit, the gate driver, and the like arranged on the circuit layer 12 can include a plurality of transistors. The transistors can be implemented as an oxide TFT including an oxide semiconductor, a low temperature poly silicon (LTPS) TFT including an LTPS, and the like. The transistors can be implemented as a p-channel TFT or an n-channel TFT. In the embodiment, an example in which the transistors of the pixel circuit are implemented as the p-channel TFTs is mainly described, but the present disclosure is not limited thereto.

Referring to FIG. 5, a pixel circuit includes a light-emitting element OLED, a driving element DT that supplies a current to the light-emitting element OLED, a switch element M01 that connects a data line DL in response to a scan pulse SCAN, and a capacitor Cst connected to a gate of the driving element DT. Here, the driving element DT and the switch element M01 can be embodied as n-channel transistors. The data line DL is connected to a data voltage Vdata. The driving element DT is connected to a pixel driving voltage ELVDD (also referred to as a second pixel driving voltage) via a pixel line PL.

The driving element DT drives the light-emitting element OLED by supplying a current thereto according to a gate-source voltage Vgs. The light-emitting element OLED is turned on and emits light when a forward voltage between an anode electrode and a cathode electrode is higher than or equal to a threshold voltage. The capacitor Cst maintains the gate-source voltage Vgs of the driving element DT.

The pixel circuit shown in FIG. 5 can be applied to both a display area and a sensing area. Here, the pixel circuit is only an example, and various types of pixel circuits are applicable.

In this case, the pixel circuit is driven by setting a margin of a low-potential supply voltage (also referred to as a first pixel driving voltage, which is lower than the second pixel driving voltage ELVDD) ELVSS to be large according to driving characteristics of the sensing area and thus a voltage applied to the light-emitting element OLED increases, which may result in an increase of power consumption.

Therefore, in an embodiment, the low-potential supply voltage ELVSS is adjusted to reduce power consumption if a maximum grayscale represented by pixel data to be supplied to the sensing area is equal to or less than a predetermined threshold. Here, the predetermined threshold can be a luminance value that does not change even when the low-potential supply voltage ELVSS changes.

FIGS. 6 to 10C are diagrams for describing a principle of adjusting a low-potential supply voltage according to a first embodiment of the present disclosure. In the first embodiment, an example in which when a cathode electrode is divided between a display area DA and a sensing area SA and different low-potential supply voltages, i.e., a first low-potential supply voltage ELVSS1 and a second low-potential supply voltage ELVSS2, are independently applied to regions of the cathode electrode, the first low-potential supply voltage ELVSS1 and the second low-potential supply voltage ELVSS2 are adjusted by a timing controller 303 will be described.

Figure 6:
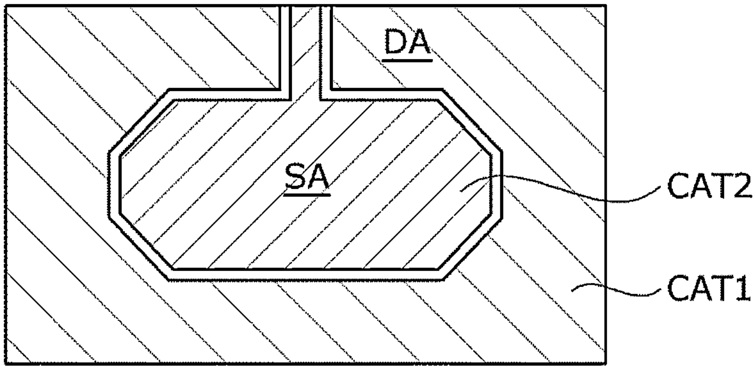
FIGS. 6, 7, 8, 9, 10A, 10B and 10C are diagrams for describing a principle of adjusting a low-potential supply voltage according to a first embodiment of the present disclosure.

Referring to FIG. 6, in an embodiment, a cathode electrode of a light-emitting element in a pixel circuit is divided between a display area DA and a sensing area SA such that the display area DA includes a first cathode electrode CAT1, and the sensing area SA includes a second cathode electrode CAT2. The first cathode electrode CAT1 and the second cathode electrode CAT2 are electrically disconnected from each other, the first cathode electrode CAT1 is commonly connected to light-emitting elements of pixels in the display area DA, and the second cathode electrode CAT2 is commonly connected to light-emitting elements of pixels placed in the sensing area SA.

Different low-potential supply voltages are independently applied to the pixels through the first and second cathode electrodes CAT1 and CAT2 that are electrically disconnected from each other. For example, the second low-potential supply voltage ELVSS2 is applied to the second cathode electrode CAT2 in the sensing area SA, and the first low-potential supply voltage ELVSS1 is applied to the first cathode electrode CAT1 in the display area DA.

Figure 7:
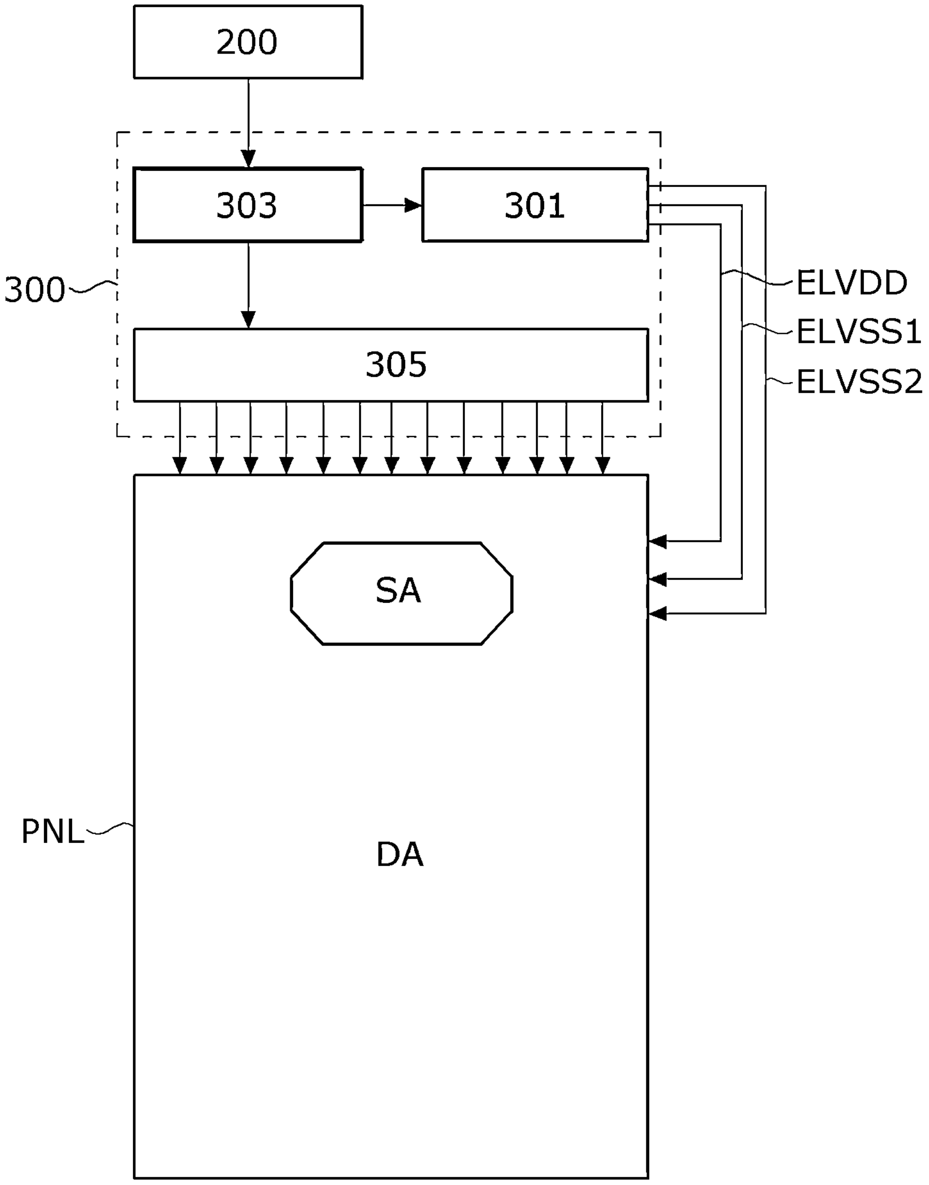

Referring to FIG. 7, a drive integrated circuit (IC) 300 includes a power supply 301, a timing controller 303, and a data driver 305. The timing controller 303 can provide the data driver 305 with pixel data of an input image received from a host system 200, and the data driver 305 can output a data voltage corresponding to the pixel data to pixels of a display panel PNL.

In this case, the timing controller 303 can extract a maximum grayscale from among grayscales represented by pixel data to be supplied to a sensing area SA among pieces of pixel data of the input image to be supplied to a display area DA and the sensing area SA.

Figure 8:
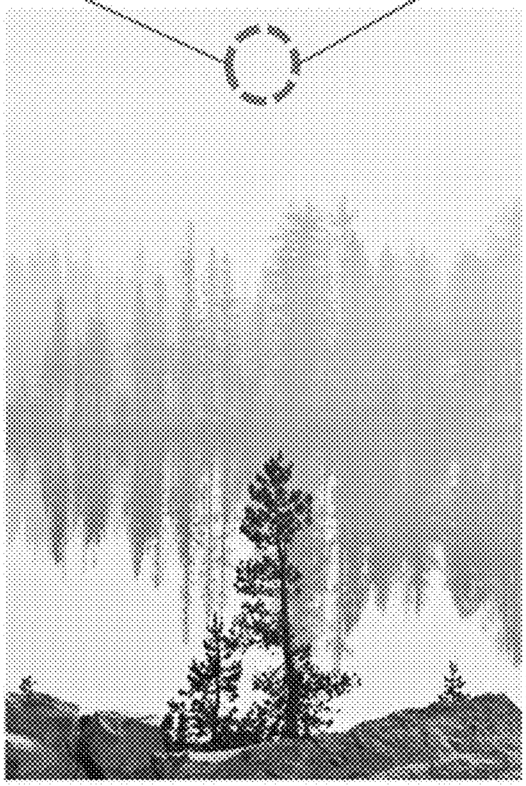
Figure 9:
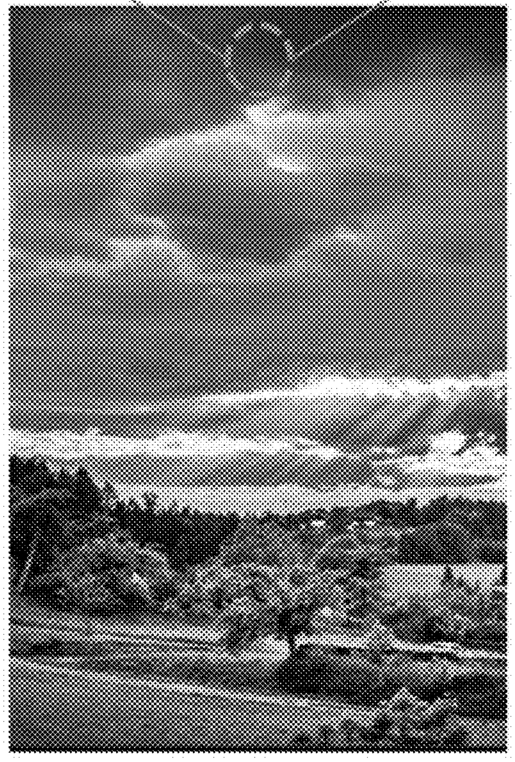

The maximum grayscale is 255 when the grayscales represented by the pixel data to be supplied to the sensing area SA are in a range of 240 to 255 as shown in FIG. 8, and is 55 when the grayscales represented by the pixel data to be supplied to the sensing area SA are in a range of 20 to 55 as shown in FIG. 9.

The timing controller 303 can compare the extracted maximum grayscale with a predetermined threshold, calculate a voltage variation for adjusting the second low-potential supply voltage ELVSS2 to be applied to the pixels in the sensing area SA when a result of the comparison reveals that the maximum grayscale is equal to or less than the threshold, and adjust the second low-potential supply voltage ELVSS2 by the calculated voltage variation.

For example, the timing controller 303 increases the second low-potential supply voltage ELVSS2, which is to be applied to the pixels in the sensing area SA, by the calculated voltage variation when the maximum grayscale is equal to or less than the threshold.

In this case, the timing controller 303 adjusts the second low-potential supply voltage ELVSS2 by the calculated voltage variation in phases in a predetermined number of frame periods, in which the second low-potential supply voltage ELVSS2 is adjusted in a vertical blank period.

Figure 10A:
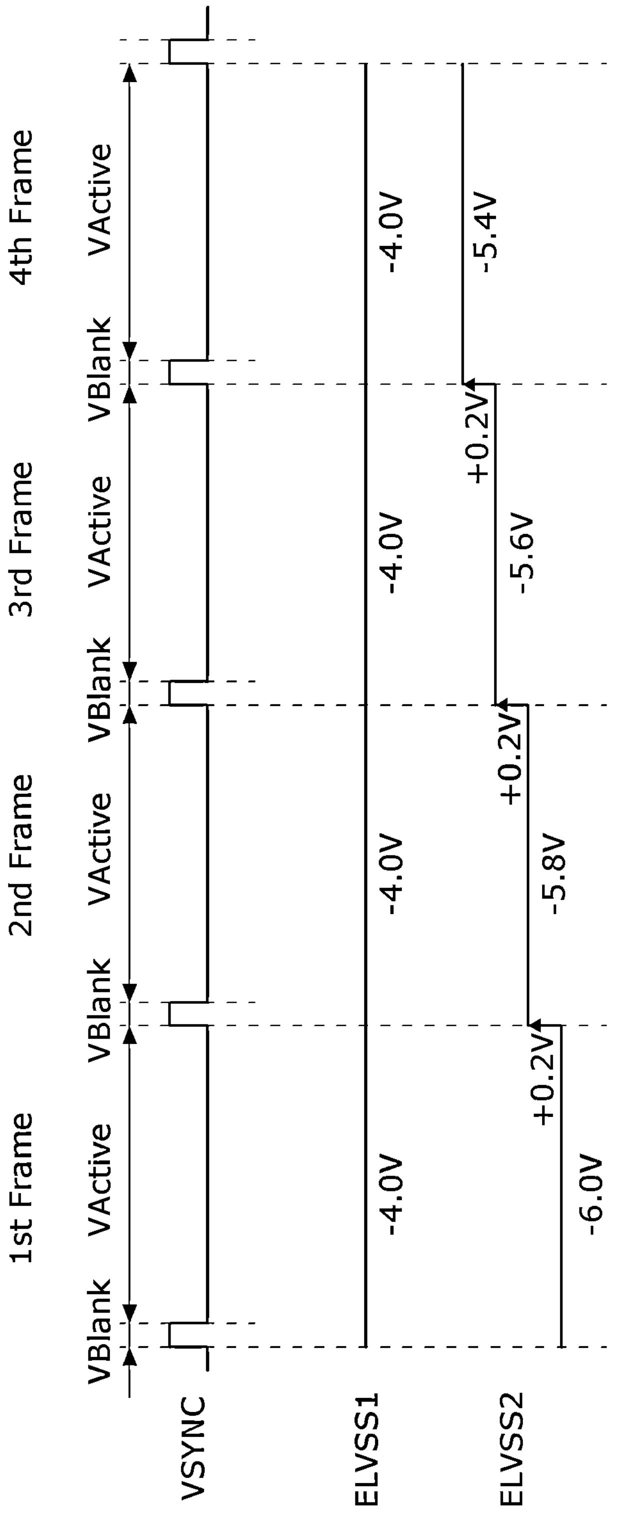

As shown in FIG. 10A, the timing controller 303 can adjust the second low-potential supply voltage ELVSS2 by the calculated voltage variation in phases in a predetermined number of frame periods.

For example, when the second low-potential supply voltage is −6.0 V in a first frame period, the voltage variation is 0.6 V, and the predetermined number is three, the timing controller 303 increases the second low-potential supply voltage ELVSS2 by 0.2 V in a vertical blank period to adjust the second low-potential supply voltage ELVSS2 to −5.8 V in a second frame period, increases the second low-potential supply voltage ELVSS2 by 0.2 V in a vertical blank period to adjust the second low-potential supply voltage ELVSS2 to −5.6 V in a third frame period, and increases the second low-potential supply voltage ELVSS2 by 0.2 V in a vertical blank period to adjust the second low-potential supply voltage ELVSS2 finally to −5.4 V in a fourth frame period.

In addition, the timing controller 303 calculates a voltage variation differently according to the difference between a maximum grayscale and a threshold. For example, the voltage variation is calculated to be larger as the voltage variation increases, and calculated to be smaller as the voltage variation decreases.

The timing controller 303 sets a total number of frame periods according to the calculated voltage variation, or differently sets a voltage, for adjusting the second low-potential supply voltage ELVSS2, in each of a predetermined number of frame periods.

Figure 10B:
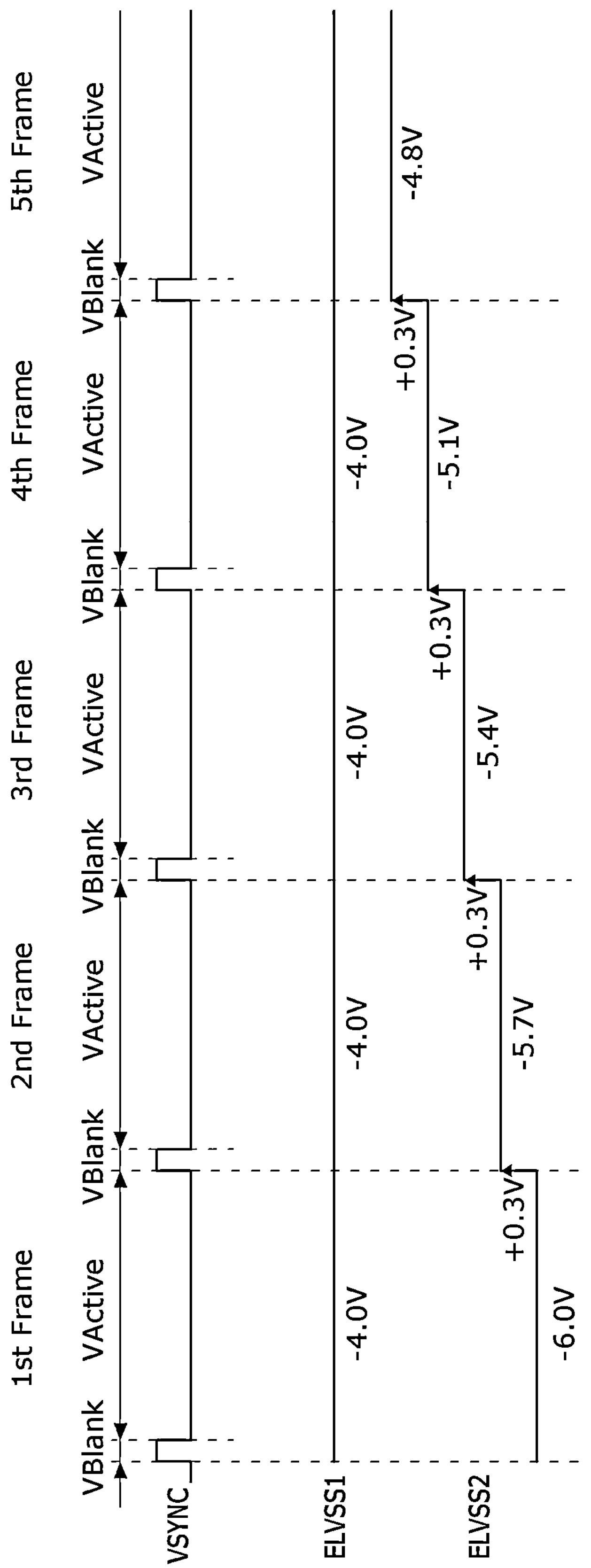

As shown in FIG. 10B, when the calculated voltage variation is 1.2 V, the timing controller 303 sets a total number of frame periods, in which the second low-potential supply voltage ELVSS2 is adjusted by 0.3 V, to four.

For example, when the second low-potential supply voltage is −6.0 V in a first frame period, the voltage variation is −0.6 V, and the predetermined number is four, the timing controller 303 increases the second low-potential supply voltage ELVSS2 by 0.3 V in a vertical blank period to adjust the second low-potential supply voltage ELVSS2 to −5.7 V in a second frame period, increases the second low-potential supply voltage ELVSS2 by 0.3 V in a vertical blank period to adjust the second low-potential supply voltage ELVSS2 to −5.4 V in a third frame period, increases the second low-potential supply voltage ELVSS2 by 0.3 V in a vertical blank period to adjust the second low-potential supply voltage ELVSS2 finally to −5.1 V in a fourth frame period, and increases the second low-potential supply voltage ELVSS2 by 0.3 V in a vertical blank period to adjust the second low-potential supply voltage ELVSS2 finally to −4.8V in a fifth frame period.

Figure 10C:
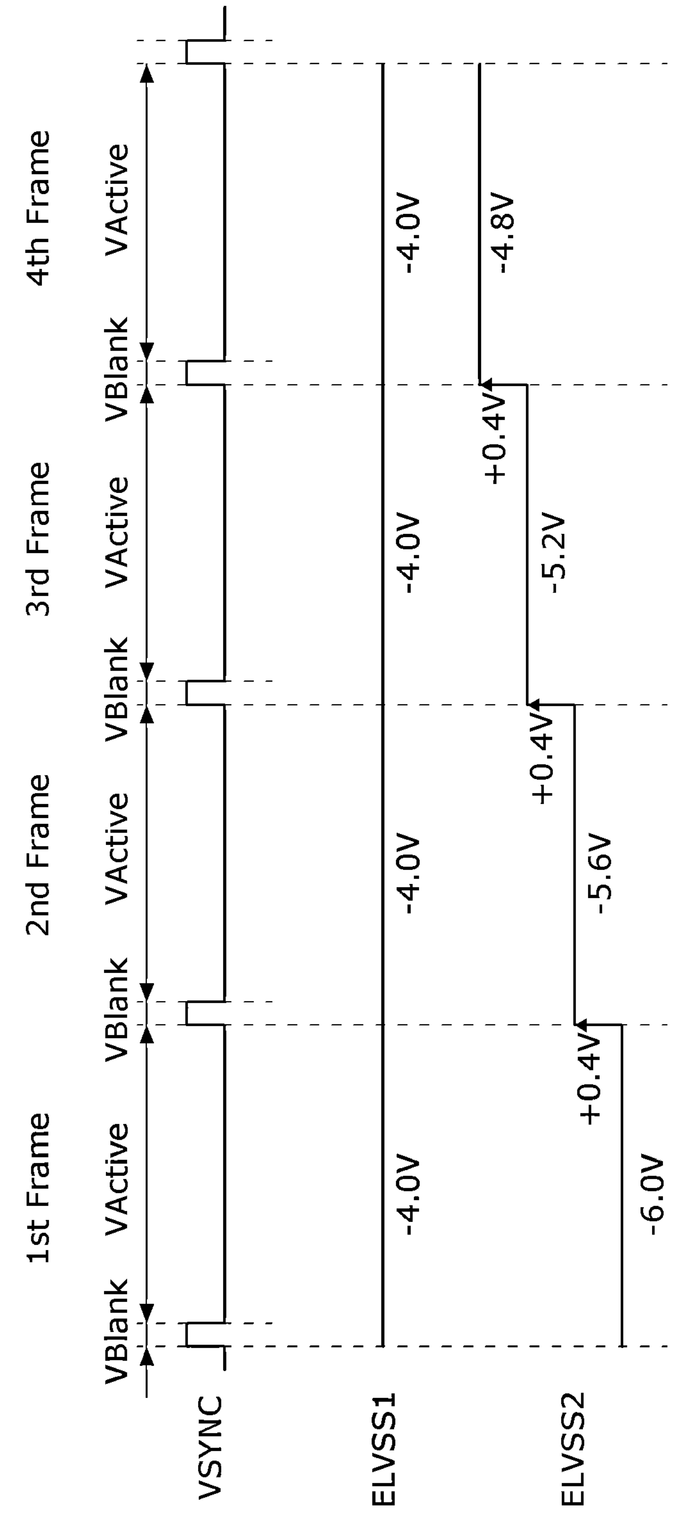

As shown in FIG. 10C, when the calculated voltage variation is 1.2V, the timing controller 303 can set a voltage, for adjusting the second low-potential supply voltage ELVSS2 in predetermined three frame periods, to 0.4V.

For example, when the second low-potential supply voltage is −6.0 V in a first frame period, the voltage variation is 1.2 V, and the predetermined number is three, the timing controller 303 increases the second low-potential supply voltage ELVSS2 by 0.4 V in a vertical blank period to adjust the second low-potential supply voltage ELVSS2 to −5.6 V in a second frame period, increases the second low-potential supply voltage ELVSS2 by 0.4 V in a vertical blank period to adjust the second low-potential supply voltage ELVSS2 to −5.2 V in a third frame period, and increases the second low-potential supply voltage ELVSS2 by 0.4 V in a vertical blank period to adjust the second low-potential supply voltage ELVSS2 finally to −4.8 V in a fourth frame period.

The method described herein is only an example, and various methods are applicable according to various embodiments of the present disclosure.

Figure 11:
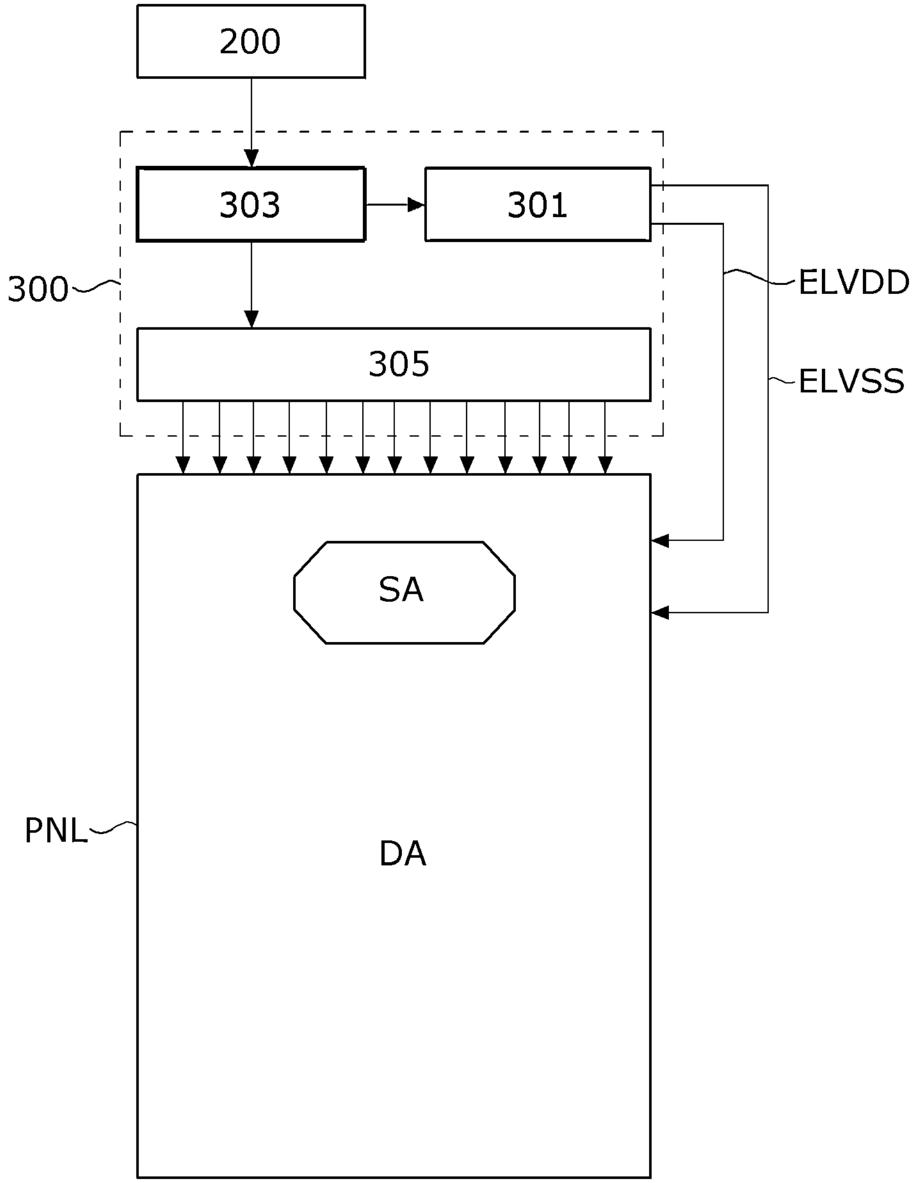
FIGS. 11 and 12 are diagrams for describing a principle of adjusting a low-potential supply voltage according to a second embodiment of the present disclosure.
Figure 12:
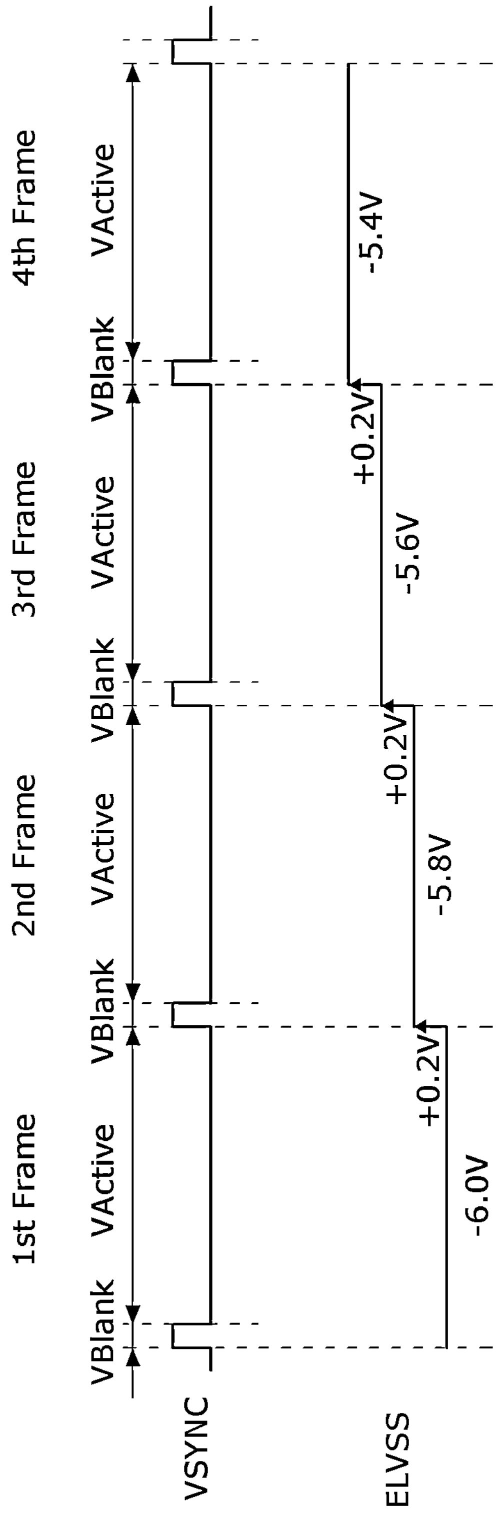

FIGS. 11 and 12 are diagrams for describing a principle of adjusting a low-potential supply voltage according to a second embodiment of the present disclosure. In the second embodiment, an example in which one cathode electrode is formed in all regions of a display area DA and a sensing area SA to adjust a low-potential supply voltage EL VSS by the timing controller 303 when a common low-potential supply voltage is applied to all pixels will be described below.

Referring to FIG. 11, a drive IC 300 includes a power supply 301, a timing controller 303, and a data driver 305. The timing controller 303 can provide the data driver 305 with pixel data of an input image received from a host system 200, and the data driver 305 can output a data voltage corresponding to the pixel data to pixels of a display panel PNL.

In this case, the timing controller 303 can extract a maximum grayscale from among grayscales represented by pixel data of the input image to be supplied to a display area DA, compare the extracted maximum grayscale with a predetermined threshold, calculate a voltage variation for adjusting a low-potential supply voltage ELVSS to be applied to pixels in a display panel when a result of the comparison reveals that the maximum grayscale is equal to or less than the threshold, and adjust the low-potential supply voltage ELVSS by the calculated voltage variation.

As shown in FIG. 12, the timing controller 303 can adjust the low-potential supply voltage ELVSS by the calculated voltage variation in phases in a predetermined number of frame periods.

Figure 13:
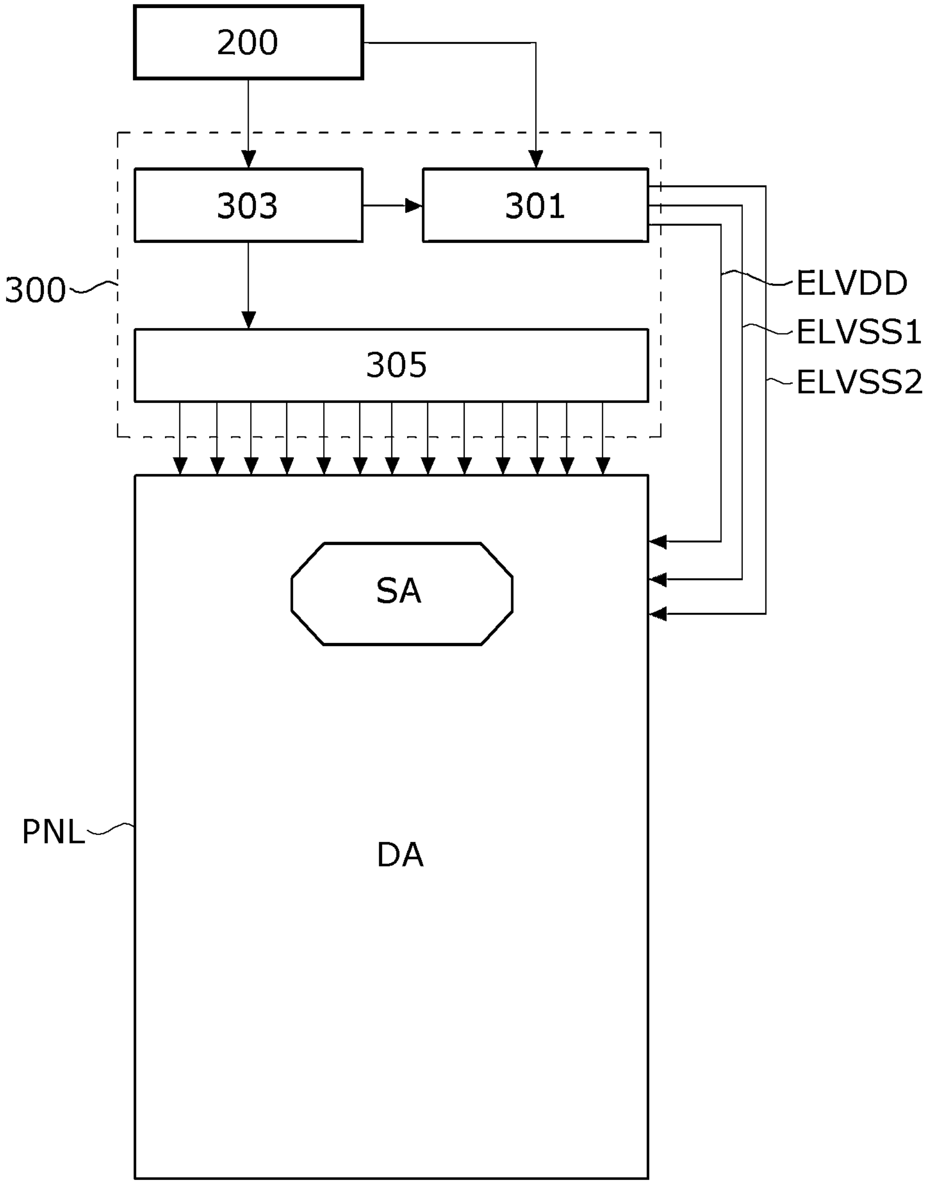
FIG. 13 is a diagram for describing a principle of adjusting a low-potential supply voltage according to a third embodiment.

FIG. 13 is a diagram for describing a principle of adjusting a low-potential supply voltage according to a third embodiment of the present disclosure. In the third embodiment, an example in which when a cathode electrode is divided between a display area DA and a sensing area SA and different low-potential supply voltages, i.e., a first low-potential supply voltage ELVSS1 and a second low-potential supply voltage ELVSS2, are independently applied to regions of the cathode electrode, the second low-potential supply voltage ELVSS2 is adjusted by a host system 200 will be described.

Referring to FIG. 13, a drive IC 300 includes a power supply 301, a timing controller 303, and a data driver 305. The timing controller 303 can provide the data driver 305 with pixel data of an input image received from a host system 200, and the data driver 305 can output a data voltage corresponding to the pixel data to pixels of a display panel PNL.

In this case, the host system 200 can extract a maximum grayscale from among grayscales represented by pixel data to be supplied to a sensing area SA among pieces of pixel data of the input image to be supplied to a display area DA and the sensing area SA.

The host system 200 can compare the extracted maximum grayscale with a predetermined threshold, calculate a voltage variation for adjusting the second low-potential supply voltage ELVSS2 to be applied to the pixels in the sensing area SA when a result of the comparison reveals that the maximum grayscale is equal to or less than the threshold, and adjust the second low-potential supply voltage ELVSS2 by the calculated voltage variation.

Figure 14:
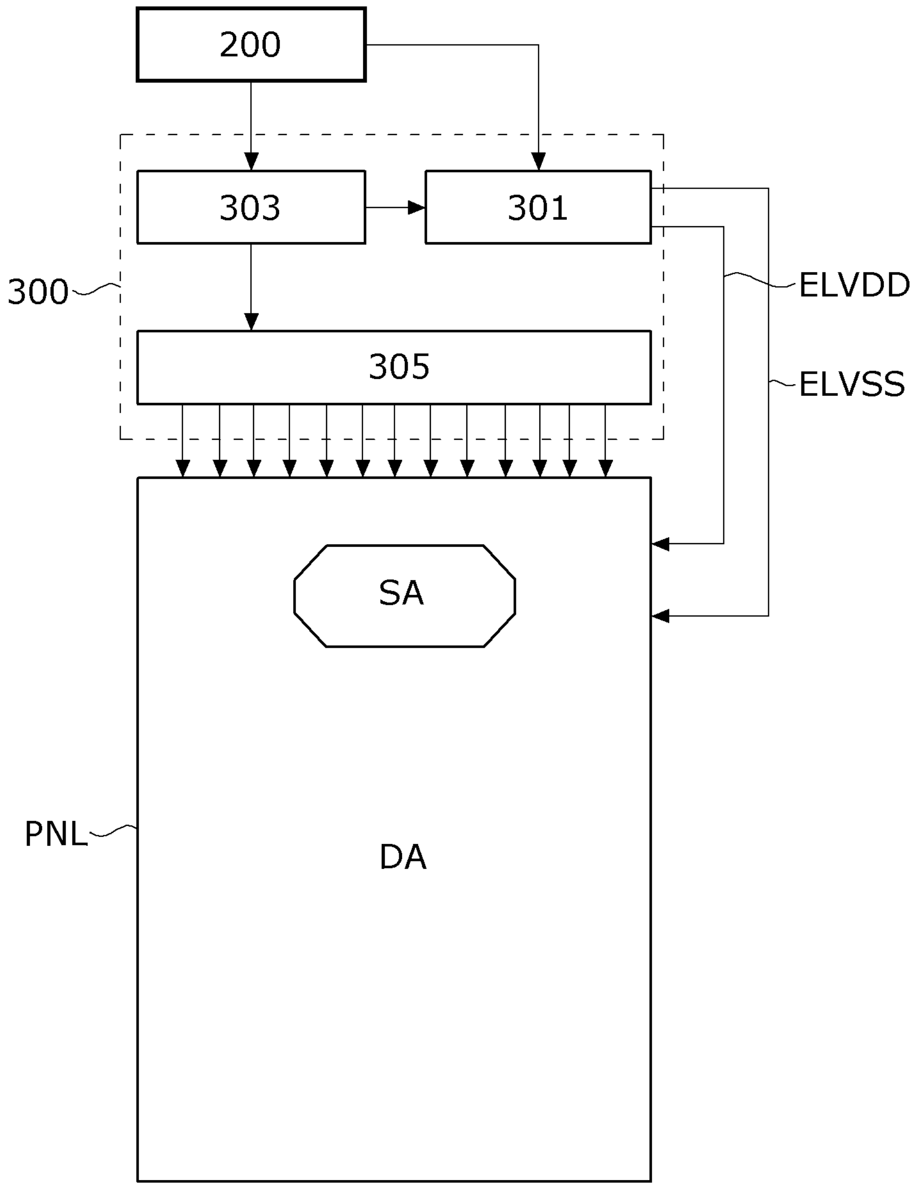
FIG. 14 is a diagram for describing a principle of adjusting a low-potential supply voltage according to a fourth embodiment of the present disclosure.

FIG. 14 is a diagram for describing a principle of adjusting a low-potential supply voltage according to a fourth embodiment of the present disclosure. In a fourth embodiment, an example in which one cathode electrode is formed in all regions of a display area DA and a sensing area SA to adjust a low-potential supply voltage ELVSS by the host system 200 when a common low-potential supply voltage is applied to all pixels will be described below.

Referring to FIG. 14, a drive IC 300 includes a power supply 301, a timing controller 303, and a data driver 305. The timing controller 303 can provide the data driver 305 with pixel data of an input image received from a host system 200, and the data driver 305 can output a data voltage corresponding to the pixel data to pixels of a display panel PNL.

In this case, the host system 200 can extract a maximum grayscale from among grayscales represented by pixel data of the input image to be supplied to a display area DA, compare the extracted maximum grayscale with a predetermined threshold, calculate a voltage variation for adjusting a low-potential supply voltage ELVSS to be applied to the pixels in the display panel PNL when a result of the comparison reveals that the maximum grayscale is equal to or less than the threshold, and adjust the low-potential supply voltage ELVSS by the calculated voltage variation.

Figure 15:
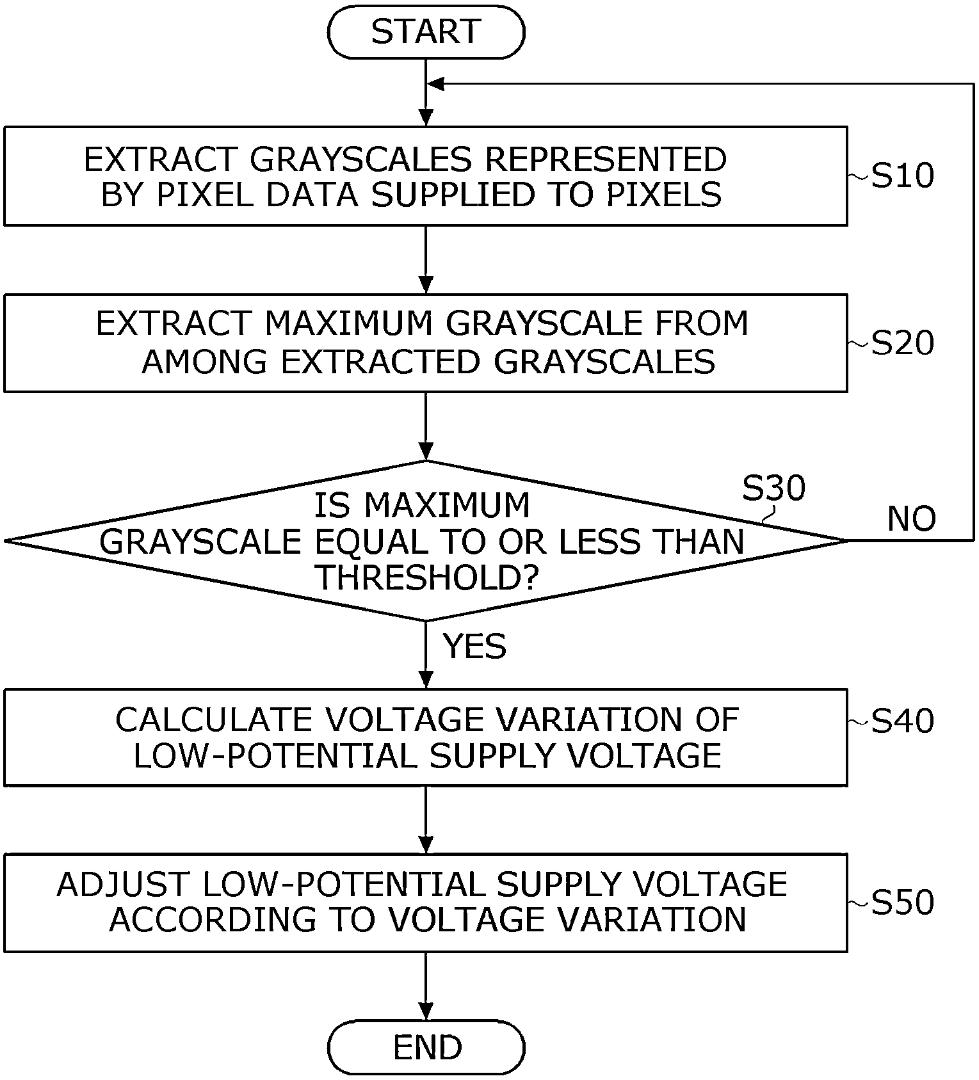
FIG. 15 is a diagram illustrating a driving method of a display device according to an embodiment of the present disclosure.

FIG. 15 is a diagram illustrating a driving method of a display device according to an embodiment of the present disclosure.

Referring to FIG. 15, a display device according to an embodiment of the present disclosure can extract grayscales represented by pixel data of an input image supplied to pixels in the display area DA or a sensing area SA (S10).

Next, the display device can extract a maximum grayscale from among the extracted grayscales (S20).

Next, the display device can compare whether the extracted maximum grayscale is equal to or less than a predetermined threshold (S30).

Next, the display device can calculate a voltage variation of a low-potential supply voltage to be applied to the pixels when a result of the comparison reveals that the extracted maximum grayscale is equal to or less than the predetermined threshold (S40).

On the other hand, when the extracted maximum grayscale is greater than the predetermined threshold, the low-potential supply voltage is not adjusted and thus the display device repeatedly performs the above process, starting from extracting grayscales represented by pixel data.

Next, the display device can adjust the low-potential supply voltage, which is to be applied to the pixels, in phases according to the calculated voltage variation in a predetermined frame period (S50).

Figure 16:
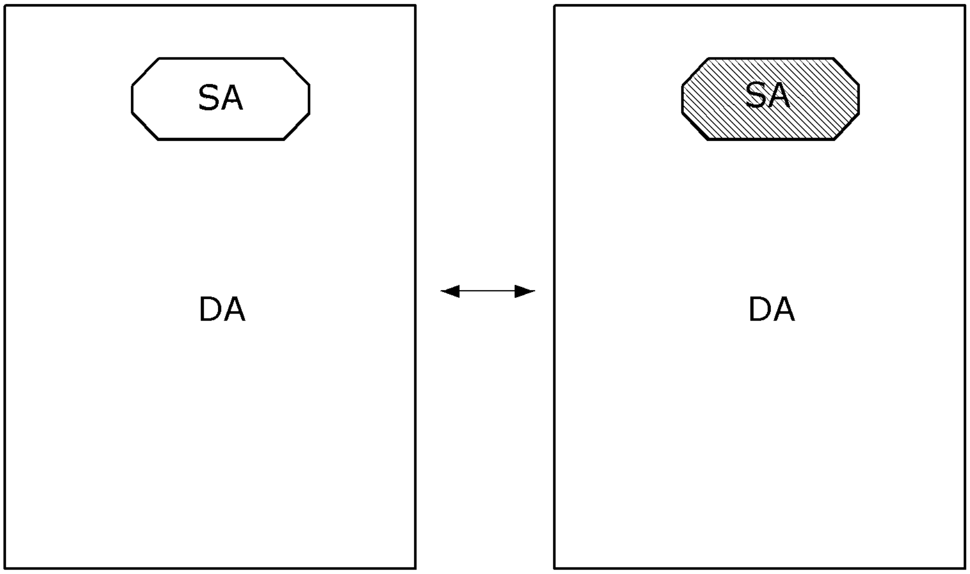
FIG. 16 is a diagram for verifying an adjusted state of a low-potential supply voltage according to an embodiment of the present disclosure.

FIG. 16 is a diagram for verifying an adjusted state of a low-potential supply voltage according to an embodiment of the present disclosure.

Referring to FIG. 16, a low-potential supply voltage applied to pixels in a sensing area SA can be measured by alternately supplying white data and black data to the pixels in the sensing area SA while white data is supplied to pixels in a display area DA to determine whether there is a change in a certain grayscale on the basis of the measured low-potential supply voltage.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:

a display panel including a first pixel area and a second pixel area, wherein pixels of a first resolution that are connected to a first cathode electrode are arranged in the first pixel area, and pixels of a second resolution that are connected to a second cathode electrode are arranged in the second pixel area;

a power supply configured to apply a pixel driving voltage, a first low-potential supply voltage and a second low-potential supply voltage to the plurality of pixels; and a timing controller configured to adjust the second low-potential supply voltage to the second cathode electrode when a maximum grayscale represented by pixel data to be applied to the plurality of pixels of the second resolution is equal to or less than a predetermined threshold, wherein the first low-potential supply voltage is applied to the first cathode electrode in the first pixel area, and the second low-potential supply voltage is applied to the second cathode electrode in the second pixel area, and wherein adjusting the second low-potential supply voltage by the timing controller includes:

calculating a voltage variation of the second low-potential supply voltage according to a difference between the maximum grayscale and the predetermined threshold, calculating an amount of change in the second low-potential supply voltage based on the calculated voltage variation and a predetermined number of frame periods, and adjusting the second low-potential supply voltage by the calculated amount of change in each of the predetermined number of frame periods, the predetermined number of frame periods being equal to or greater than two.

2. The display device of claim 1, wherein the timing controller increases the second low-potential supply voltage by the calculated amount of change in phases in the predetermined number of frame periods.

3. The display device of claim 2, wherein the timing controller increases the second low-potential supply voltage by the calculated amount of change in a vertical blank period.

4. The display device of claim 1, wherein the timing controller increases the second low-potential supply voltage, which is to be applied to the second cathode electrode, by the calculated amount of change in phases in the predetermined number of frame periods.

5. The display device of claim 4, wherein the timing controller increases the second low-potential supply voltage, which is to be applied to the second cathode electrode, by the calculated amount of change in a vertical blank period.

6. The display device of claim 1, wherein the second low-potential supply voltage is less than the first low-potential supply voltage.

7. A display device comprising:

a display panel including a first pixel area and a second pixel area, wherein pixels of a first resolution that are connected to a first cathode electrode are arranged in the first pixel area, and pixels of a second resolution that are connected to a second cathode electrode are arranged in the second pixel area;

a power supply configured to apply a pixel driving voltage, a first low-potential supply voltage and a second low-potential supply voltage to the plurality of pixels; and a host system configured to adjust the second low-potential supply voltage to the second cathode electrode when a maximum grayscale represented by pixel data to be supplied to the plurality of pixels of the second resolution is equal to or less than a predetermined threshold, wherein the first low-potential supply voltage is applied to the first cathode electrode in the first pixel area, and the second low-potential supply voltage is applied to the second cathode electrode in the second pixel area, and wherein adjusting the second low-potential supply voltage by the host system includes:

calculating a voltage variation of the second low-potential supply voltage according to a difference between the maximum grayscale and the predetermined threshold, calculating an amount of change in the second low-potential supply voltage based on the calculated voltage variation and a predetermined number of frame periods, and adjusting the second low-potential supply voltage by the calculated amount in each of the predetermined number of frame periods, the predetermined number of frame periods being equal to or greater than two.

8. The display device of claim 7, wherein the host system increases the second low-potential supply voltage by the calculated amount of change in phases in the predetermined number of frame periods.

9. The display device of claim 8, wherein the host system increases the second low-potential supply voltage by the calculated amount of change in a vertical blank period.

10. The display device of claim 7, wherein the host system increases the second low-potential supply voltage, which is to be applied to the second cathode electrode, by the calculated amount of change in phases in the predetermined number of frame periods.

11. The display device of claim 10, wherein the host system increases the second low-potential supply voltage, which is to be applied to the second cathode electrode, by the calculated amount of change in a vertical blank period.

12. The display device of claim 7, wherein the second low-potential supply voltage is less than the first low-potential supply voltage.

13. A driving method comprising:

extracting a maximum grayscale from among grayscale represented by pixel data to be supplied to a plurality of pixels in a display panel;

comparing whether the extracted maximum grayscale is equal to or less than a predetermined threshold; and when the comparing indicates that extracted maximum grayscale is equal to or less than the predetermined threshold, calculating a voltage variation and adjusting a low-potential supply voltage, which is to be applied to the plurality of pixels, by the voltage variation, wherein the display panel comprises a first pixel area and a second pixel area, wherein pixels of a first resolution that are connected to a first cathode electrode are arranged in the first pixel area, and pixels of a second resolution that are connected to a second cathode electrode are arranged in the second pixel area, wherein the low-potential supply voltage includes a first low-potential supply voltage applied to the first cathode electrode in the first pixel area, and a second low-potential supply voltage applied to the second cathode electrode in the second pixel area, wherein the calculating of the voltage variation comprises calculating the voltage variation of the second low-potential supply voltage when the extracted maximum grayscale by pixel data to be supplied to the pixels of the second resolution is equal to or less than the predetermined threshold, and wherein the adjusting the low-potential supply voltage comprises:

calculating an amount of change in the second low-potential supply voltage based on the calculated voltage variation and a predetermined number of frame periods; and adjusting the second low-potential supply voltage by the calculated amount in each of the predetermined number of frame periods, the predetermined number of frame periods being equal to or greater than two.

14. The driving method of claim 13, wherein the adjusting of the low-potential supply voltage comprises increasing the second low-potential supply voltage by the voltage variation in phases in the predetermined number of frame periods.

15. The driving method of claim 13, wherein the second low-potential supply voltage is less than the first low-potential supply voltage.

* * * * *